April 28, 1931. A. CAROZZI 1,803,232
COFFEE MACHINE
Filed Jan. 13, 1930
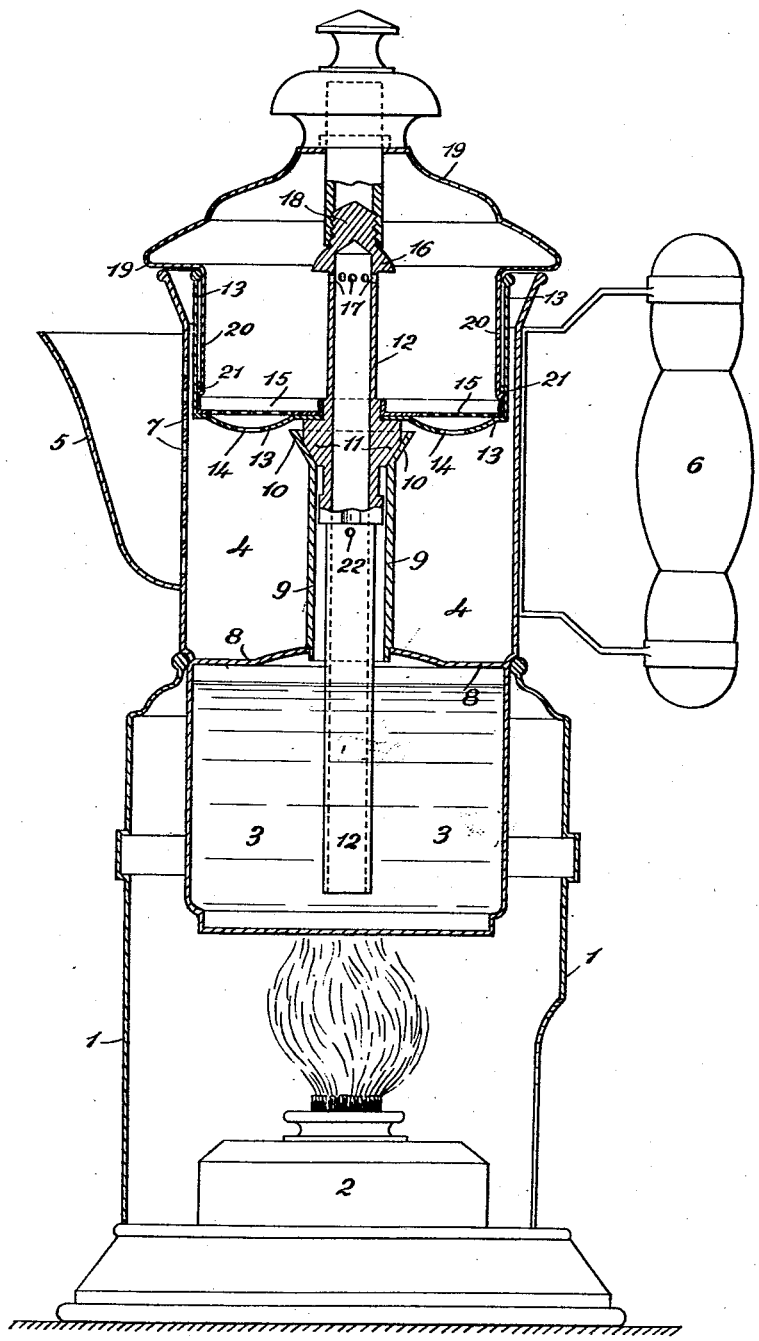
A. Carozzi
INVENTOR
By: Marks & Clerk
Atty Patented Apr. 28, 1931

1,803,232

UNITED STATES PATENT OFFICE

AUGUSTO CAROZZI, OF ROME, ITALY

COFFEE MACHINE

Application filed January 13, 1930. Serial No. 420,586.

It is known that in domestic coffee-machines the rapid boiling of water causes the latter to be poured on the ground coffee placed in the filter without being preceded by steam, with the result that the coffee is not completely exhausted.

By my present invention this drawback is removed because as the water is about and beginning to boil the resultant steam is gradually carried onto the coffee, so as to soften it before the boiling water is poured out over same.

Another advantage of my present invention consists in that the various parts forming the machine are easily assembled and disassembled, and have no fittings thereon, and the top of the machine is capable of rising, so as to act as a safety valve.

A form of the invention is illustrated in a sectional view in the annexed drawing, where 1 is the bottom part in which the heat source 2 is placed, which may comprise a spirit lamp or electric resistance.

In the interior of the said bottom part the intermediate part of the machine is fixed, comprising a water container 3 and a receptacle 4 for the liquid coffee.

The latter receptacle supports a spout 5 for pouring out the coffee, and a handle 6, the spout being placed in front of the holes 7 provided in the receptacle.

On the partition 8 between the containers 3 and 4 a tube 9 is fixed communicating with the water and terminating at the top with an inverted truncated cone 10 forming a tight seat with the corresponding part 11 of a sleeve carried with the immerged tube 12.

The said immerged tube is fixed to the interior of tube 9 penetrating with its bottom part terminating in spaced relation to the bottom of the water container 3, whilst on sleeve 11 the bowl 13 for the coffee powder is fixed, suitably perforated at 14 for the liquid coffee, and a supporting filter 15.

At the top the tube 12 is closed by a cap 16 of greater diameter and below said cap holes 17 are provided in the tube for the discharge of boiling water. The said cap terminates in a threaded part 18 onto which the depending sleeve of the cover 19 is screwed, the cover being provided with a flange 20 which engages the interior of bowl 13 and forms a seal with the latter by its rim 21 situated in turn at the lower outer edge of the flange.

Further on the said tube there is a hole 22 above the water level, for the passage of steam.

My improved coffee-machine is operated by putting the ground coffee into the bowl and on the filter 15, whereupon onto the top 18 of the immerged tube 12 cover 19 is screwed. The water in the container 3 is heated by source 2 and begins to emit steam which passing through hole 22 of tube 12 above the water level is discharged through holes 17 and moistens the coffee-powder so as to prepare same for the jet of boiling water.

On having reached the proper boiling temperature the water passes into the tube 12 and is discharged through holes 17 and sprayed on the steam moistened ground coffee by cap 16 whereupon the liquid coffee is collected in container 4 after passing through the filter 15 and the holes 14 of bowl 13.

I claim:

1. A coffee machine of the character described, including an intermediate part divided to form a water container and an upper receptacle for the liquid coffee, a tube arranged in the receptacle and connected with the bottom thereof and communicating with the water container, a sleeve arranged through the tube and projecting above and below the ends of said tube and closing the top of said tube and having a hole above the water level in the container and beneath the closed top of the tube and also having holes near the upper terminal of the upper projecting end, a coffee receiving bowl removably mounted on the sleeve and positioned in the upper part of the liquid coffee receptacle, and a cover for the bowl detachably connected to the upper projecting end of the sleeve and removable with the sleeve and bowl as a unit, substantially as and for the purposes set forth.

2. A coffee machine of the character described, including an intermediate part divided to form a water container and receptacle for the liquid coffee, a tube arranged in the receptacle and connected to the bottom of the receptacle and communicating with the water container, a sleeve arranged through the tube and projecting above and below the ends thereof and closing the top of the tube, the said sleeve having a hole above the water level of the container and beneath the closed top of the tube and also having holes near the upper terminal of the upper projecting end thereof, a cap of greater diameter than the sleeve forming a closure for the extreme upper end thereof and terminating in a threaded part, a coffee receiving bowl removably mounted on the sleeve above the tube, a filter in the bowl, a cover detachably engaged with the threaded part of the sleeve and having a flange adapted for engaging the inner surface of the coffee bowl and forming a seal therewith.

3. A coffee machine as claimed in claim 2, wherein the upper end of the tube terminates in a conical seat and wherein a truncated conical projection is provided on the sleeve for closing the tube, and the upper part of the projection serving as a seat for supporting the bowl.

In testimony whereof I have hereunto signed my name.

AUGUSTO CAROZZI.